(12) United States Patent
Nishikawa et al.

(10) Patent No.: US 10,340,564 B2
(45) Date of Patent: Jul. 2, 2019

(54) VEHICULAR STORAGE BATTERY DEVICE

(71) Applicant: KABUSHIKI KAISHA TOSHIBA, Minato-ku, Tokyo (JP)

(72) Inventors: Akinobu Nishikawa, Inagi Tokyo (JP); Shigeki Kono, Sayama Saitama (JP); Masaki Sato, Hachioji Tokyo (JP); Tatsuya Arai, Fuchu Tokyo (JP); Kotaro Ogawa, Fuchu Tokyo (JP); Shinichiro Kosugi, Yokohama Kanagawa (JP); Masahiro Sekino, Shinjuku Tokyo (JP); Kazuto Kuroda, Arakawa Tokyo (JP); Hideaki Yasui, Fuchu Tokyo (JP); Mai Honda, Kita Tokyo (JP); Tomonao Takamatsu, Kawasaki Kanagawa (JP); Mitsunobu Yoshida, Kawasaki Kanagawa (JP); Takafumi Nakahama, Fuchu Tokyo (JP); Akihiko Ujiie, Chofu Tokyo (JP); Atsumi Kondo, Koganei Tokyo (JP); Masahiro Kurosu, Koganei Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 98 days.

(21) Appl. No.: 15/511,479

(22) PCT Filed: Jan. 6, 2015

(86) PCT No.: PCT/JP2015/050174
§ 371 (c)(1),
(2) Date: Mar. 15, 2017

(87) PCT Pub. No.: WO2016/042783
PCT Pub. Date: Mar. 24, 2016

(65) Prior Publication Data
US 2017/0263985 A1  Sep. 14, 2017

(30) Foreign Application Priority Data

Sep. 17, 2014 (JP) ................................ 2014-188538

(51) Int. Cl.
*H01M 10/625* (2014.01)
*H01M 10/6551* (2014.01)
(Continued)

(52) U.S. Cl.
CPC ......... *H01M 10/625* (2015.04); *B60L 3/0046* (2013.01); *B60L 50/64* (2019.02);
(Continued)

(58) Field of Classification Search
CPC ............. H01M 10/613; H01M 10/625; H01M 10/6552; H01M 10/6556; H01M 10/6563;
(Continued)

(56) References Cited

U.S. PATENT DOCUMENTS

2004/0261377 A1* 12/2004 Sung ................... H01M 10/625
55/385.3
2008/0248379 A1  10/2008 Takeuchi et al.
(Continued)

FOREIGN PATENT DOCUMENTS

CN 101740802 A 6/2010
CN 102903875 A 1/2013
(Continued)

OTHER PUBLICATIONS

Partial Supplementary European Search Report dated Apr. 16, 2018 issued in counterpart European Application No. 15841256.9.
(Continued)

*Primary Examiner* — Barbara L Gilliam
*Assistant Examiner* — Adam A Arciero
(74) *Attorney, Agent, or Firm* — Holtz, Holtz & Volek PC

(57) ABSTRACT

According to one embodiment, a vehicular storage battery device includes a housing, battery boxes, and a common
(Continued)

cooling passage. The battery boxes are disposed in the housing. Each of the battery boxes houses an electric cell as a vehicle power source and includes a heat transporting part transporting heat generated in the battery box to outside of the battery box. The common cooling passage is disposed in the housing. The common cooling passage is provided with an inlet for taking in a fluid and an outlet for discharging the fluid having passed through the passage. The inlet and the outlet are open in a direction different from a traveling direction of the vehicle. The heat transporting part of each of the battery boxes is exposed to inside of the passage.

7 Claims, 7 Drawing Sheets

(51) Int. Cl.
| | |
|---|---|
| H01M 10/6556 | (2014.01) |
| H01M 2/10 | (2006.01) |
| H01M 10/613 | (2014.01) |
| H01M 10/6563 | (2014.01) |
| H01M 10/6552 | (2014.01) |
| B60L 3/00 | (2019.01) |
| B60L 58/26 | (2019.01) |
| B60L 50/60 | (2019.01) |
| B60L 50/64 | (2019.01) |

(52) U.S. Cl.
CPC ............... *B60L 50/66* (2019.02); *B60L 58/26* (2019.02); *H01M 2/1077* (2013.01); *H01M 2/1083* (2013.01); *H01M 10/613* (2015.04); *H01M 10/6551* (2015.04); *H01M 10/6552* (2015.04); *H01M 10/6556* (2015.04); *H01M 10/6563* (2015.04); *B60L 2200/26* (2013.01); *B60L 2240/545* (2013.01); *H01M 2220/20* (2013.01); *Y02T 10/7005* (2013.01); *Y02T 10/705* (2013.01)

(58) Field of Classification Search
CPC ........... H01M 2220/20; H01M 2/1077; H01M 2/1083
See application file for complete search history.

(56) References Cited

U.S. PATENT DOCUMENTS

| | | | |
|---|---|---|---|
| 2009/0088062 A1* | 4/2009 | Major | B60H 1/00278 454/70 |
| 2009/0120620 A1* | 5/2009 | Abe | H01M 2/1077 165/104.31 |
| 2009/0256525 A1 | 10/2009 | Kitanaka | |
| 2009/0320715 A1 | 12/2009 | Morita et al. | |
| 2013/0344359 A1* | 12/2013 | Ledbetter | H01M 2/1077 429/83 |

FOREIGN PATENT DOCUMENTS

| | | |
|---|---|---|
| EP | 2012387 A1 | 1/2009 |
| EP | 2187473 A1 | 5/2010 |
| GB | 2460946 A | 12/2009 |
| JP | 2003100272 A | 4/2003 |
| JP | 2004001683 A | 1/2004 |
| JP | 2006103365 A | 4/2006 |
| JP | 2008016189 A | 1/2008 |
| JP | 4053577 B2 | 2/2008 |
| JP | 2009073439 A | 4/2009 |
| JP | 2010015931 A | 1/2010 |
| JP | 2010123349 A | 6/2010 |

OTHER PUBLICATIONS

International Search Report (ISR) (and English translation thereof) and Written Opinion dated Apr. 7, 2015 issued in International Application No. PCT/JP2015/050174.

* cited by examiner

VEHICULAR STORAGE BATTERY DEVICE

CROSS-REFERENCE TO RELATED APPLICATIONS

This application is national stage application of International Application No. PCT/JP2015/050174, filed Jan. 6, 2015, which designates the United States, incorporated herein by reference, and which claims the benefit of priority from Japanese Patent Application No. 2014-188538, filed Sep. 17, 2014, the entire contents of which are incorporated herein by reference.

FIELD

An embodiment described herein relates generally to a vehicular storage battery device.

BACKGROUND

Conventionally, there has been known a power storage device (power source device, battery device) that includes a housing, a battery disposed in the housing, and a cooling device cooling the battery and the like by applying cooling air to the battery.

When this kind of battery device is mounted on and used in a vehicle, there is required a high-robustness cooling structure for efficiently releasing heat generated by repeated electrical charging and discharging to cool the battery. Moreover, when outside air is used as a cooling medium, electrical parts including a battery, wiring, and the like preferably form the battery device so as to avoid contact with dust, moisture, and the like as much as possible.

DETAILED DESCRIPTION

In general, according to one embodiment, a vehicular storage battery device comprises a housing, battery boxes, and a common cooling passage. The battery boxes are disposed in the housing. Each of the battery boxes houses an electric cell as a vehicle power source and includes a heat transporting part transporting heat generated in the battery box to outside of the battery box. The common cooling passage is disposed in the housing. The common cooling passage is provided with an inlet for taking in a fluid and an outlet for discharging the fluid having passed through the passage. The inlet and the outlet are open in a direction different from a traveling direction of the vehicle. The heat transporting part of each of the battery boxes is exposed to inside of the passage.

The following exemplified embodiment and modification include the same components. Therefore, in the following, the same components are represented with the same symbols and the repeated explanation thereof is omitted.

Figure 1:
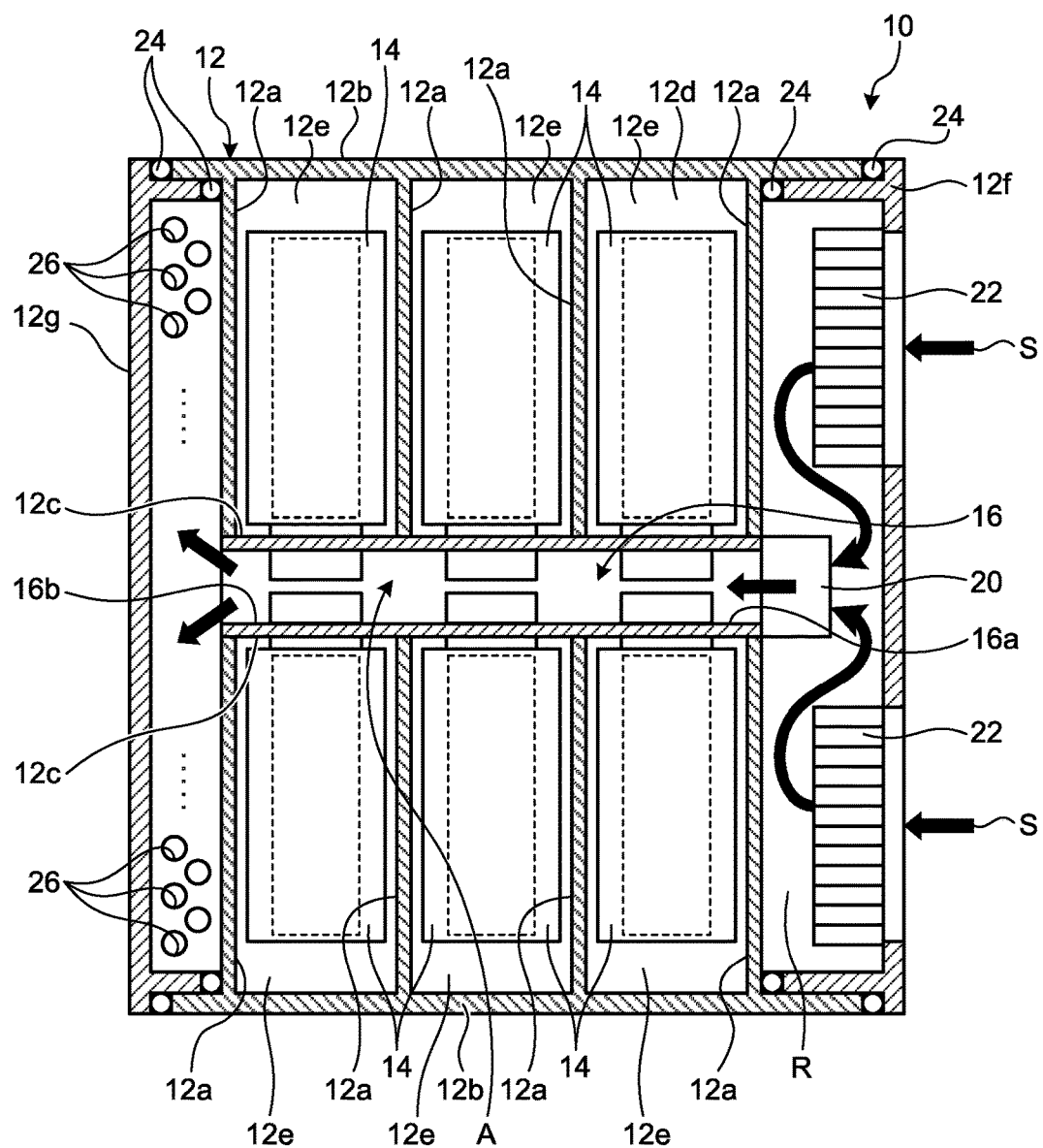
FIG. 1 is a plan view explaining a schematic structure of a storage battery unit forming a vehicular storage battery device according to an embodiment.
Figure 2:
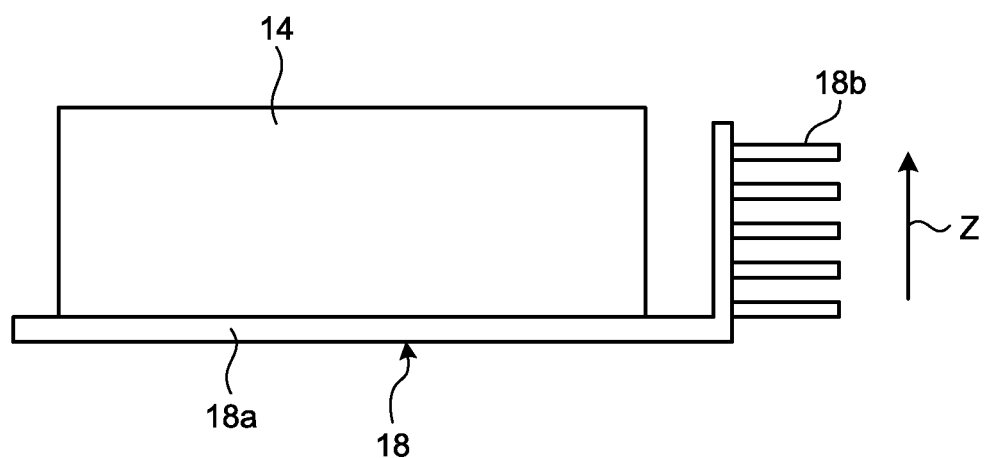
FIG. 2 is a side view explaining structures of a battery box housed in the storage battery unit forming the vehicular storage battery device of the embodiment and a heat transporting part connected to the battery box.

FIG. 1 is a plan view explaining a schematic structure of a storage battery unit 10 forming a vehicular storage battery device according to an embodiment. FIG. 2 is a side view explaining structures of one of electric cells housed in the storage battery unit 10 and a heat transporting part 18 connected to the electric cell. The storage battery unit 10 supports a plurality of battery boxes 14 housing the electric cells as a vehicle power source in a substantially square-shaped housing 12, as illustrated in FIG. 1. The vehicle may be an electric locomotive traveling by driving a driving source (motor) with power of the storage battery unit 10 or may be a hybrid locomotive having a motor and an engine as driving sources. In addition, the vehicle may be an electric vehicle, a passenger vehicle such as a hybrid vehicle, a truck, a bus, and the like. The power of the storage battery unit 10 may be supplied to an electrical equipment system (auxiliary equipment) of the vehicle. Moreover, the storage battery unit 10 may be used for an electrical equipment system of a vehicle having only an engine as a driving source.

In the housing 12, a plurality of partition walls 12a are formed, and a storage chamber 12e is defined by a side wall 12b, an inner wall 12c and a bottom face wall 12d, and an upper face wall (not illustrated). FIG. 1 illustrates the example in which six storage chambers 12e are defined. That is, in the embodiment, the six battery boxes 14 are arranged in a manner that the three battery boxes 14 are disposed on each lateral side of a common cooling passage 16 described later. Each battery box 14 is disposed in the storage chamber 12e not to be substantially exposed to outside air. As a result, it is possible to substantially prevent the battery box 14 from being in contact with dust, dirt, moisture, and the like. The material forming the housing 12 only need to secure rigidity, dust-proof property, drip-proof property, vibration resistance, and the like in a given level predetermined in the design phase and the like, and may be resin (plastic, etc.) or metal.

The battery box 14 houses therein the electric cells (battery, electric cell part, single cell)(not illustrated) connected in, for example, series or in parallel. For example, the electric cell can be formed as a secondary battery (storage battery, rechargeable battery). Moreover, the battery box 14 includes a sensor (not illustrated) detecting a voltage and a temperature of the housed electric cells. Although the illustration is omitted, the battery box 14 includes electrode terminals (positive electrode terminal, negative electrode terminal) connected electrically to the inner electric cells, and the electric cells in adjacent battery boxes 14 are electrically connected in series or in parallel through wiring (not illustrated). Then, the electric cells electrically connected to each other are connected electrically to a breaker, a battery management system, and the like housed in a device housing that is described later, whereby electrical charging and discharging control is implemented.

For example, each of the electric cells can be formed as a lithium ion secondary cell. The electric cell may be other secondary batteries such as a nickel-hydrogen secondary battery, a nickel-cadmium storage battery, and a lead storage battery.

As illustrated in FIG. 2, the battery box 14 includes a heat transporting part 18 that transports heat generated inside by electrical charging and discharging of the housed electric cells to the outside of the battery box 14. The heat transporting part 18 includes a heat pipe 18*a* connected thermally to a part of the battery box 14, for example, a lower face part thereof, and a heat radiation part 18*b* radiating heat transported by the heat pipe 18*a*. There can be used the heat pipe 18*a* in which a volatile heat transporting fluid is enclosed in the inner space of the pipe or in which the inner wall and the like is impregnated with a volatile heat transporting fluid. The heat pipe 18*a* may be connected directly to the bottom face (wall face) of the battery box 14. Moreover, for example, a plurality of grooves may be formed on a metal plate-shaped member to let a heat transporting fluid pass through the grooves or impregnate the grooves with a heat transporting fluid, and the plate-shaped member may be connected to a wall face of the battery box 14. In this manner, with the use of the heat pipe 18*a*, heat transportation can be performed more efficiently than the case in which a member having heat conductivity such as a copper plate is attached to the battery box 14. In addition, the maintenance can be performed more easily than the case of a water-cooled cooling system. For example, the heat radiation part 18*b* can be a heat sink. In the case of FIG. 2, in the heat sink, plate-shaped members are arranged with given intervals in a direction of an arrow Z in FIG. 2. The arrangement of the heat sink is one example, and the plate-shaped members may be arranged in a paper rear face direction (direction orthogonal to the arrow Z direction) of FIG. 2. In this manner, the heat transporting part 18 including the heat pipe 18*a* and the heat sink has a simple structure and high robustness, thus achieving efficient heat transportation. Moreover, as the heat radiation part 18*b*, a radiation fan may be used instead of a heat sink. In this case, the radiation fan is connected to or disposed at an end of the heat pipe 18*a* to forcedly form a heat flow, thereby radiating heat. In this manner, the battery box 14 includes the heat transporting part 18, whereby the cooling of the inside of the battery box 14 can be performed efficiently. A part including the battery box 14, the heat transporting part 18 (heat pipe 18*a*, heat radiation part 18*b*), as illustrated in FIG. 2, may be also referred to as a sub pack.

The common cooling passage 16 is formed in the housing 12. In the case of FIG. 1, the common cooling passage 16 crosses the almost-center part of the housing 12, and includes, at both ends thereof, an inlet 16*a* for taking in a cooling fluid and an outlet 16*b* discharging a fluid having passed a passage inner area A (passage inner part). For example, outside air (air) can be used as a cooling fluid. The inlet 16*a* and the outlet 16*b* are open in a direction different from a traveling direction of the vehicle having the storage battery unit 10 thereon. Moreover, in the common cooling passage 16, the heat transporting parts 18 (heat radiation parts 18*b*) of the battery boxes supported by the housings 12 are exposed to the passage inner area A. FIG. 1 illustrates the example in which the inner wall 12*c*, the bottom face wall 12*d*, and the upper face wall of the housing 12 form the common cooling passage 16. However, the embodiment is not limited thereto, and the separately formed cylindrical common cooling passage 16 may be disposed in the housing 12.

When the heat radiation part 18*b* of the heat transporting part 18 is exposed to the passage inner area A of the common cooling passage 16, an opening is provided on the inner wall 12*c* so that the heat radiation part 18*b* projects (is exposed) to the side of the passage inner area A through the opening. In this case, a sealing member or the like is disposed on a peripheral edge of the opening to prevent a fluid (e.g., outside air) passing the passage inner area A of the common cooling passage 16 from leaking to the side of the storage chamber 12*e*. In this manner, the heat radiation part 18*b* is exposed in the passage inner area A of the common cooling passage 16, whereby the heat transported from the battery boxes 14 can be exchanged effectively. Moreover, as illustrated in FIG. 1, the battery boxes 14 are disposed on both sides with the common cooling passage 16 therebetween, whereby the heat transported from the battery boxes 14 can be gathered and exchanged on the common cooling passage 16, enabling efficient cooling. Furthermore, a plurality of heat radiation parts 18*b* are gathered on the common cooling passage 16, which improves space efficiency in the housing 12. In addition, the area where the electric cells are housed can be substantially separated from the area in the common cooling passage 16 through which outside air passes, which can reduce contamination of the electric equipment such as electric cells. That is, it is possible to reduce the occurrence frequency of failure of the electric equipment or prevent the occurrence of failure. Furthermore, the common cooling passage 16 is linear substantially without any divergence, which can reduce a decrease of a flow speed (wind speed, wind force), contributing to the improvement of cooling efficiency. Moreover, a plurality of heat radiation parts 18*b* are gathered on the common cooling passage 16, which achieves a simple cooling structure. Then, it is possible to improve robustness of the cooling structure and enables a structure high in vibration resistance, dust-proof property, and drip-proof property.

In the case of the storage battery unit 10 illustrated in FIG. 1, a blower fan 20 functioning as a fluid conveyance device is disposed in the vicinity of the inlet 16*a* of the common cooling passage 16, for example, at the inlet 16*a*, so as to actively blow outside air as a cooling fluid into the passage inner area A of the common cooling passage 16. Moreover, filter devices 22 supported by an inlet side sub housing 12*f* are disposed on the upper stream side of the blower fan 20. A sealing member 24 such as a packing is disposed at a connection portion between the inlet side sub housing 12*f* and the side wall 12*b* of the housing 12 to prevent outside air (cooling fluid) not passing the filter device 22 from flowing into the inlet 16*a* side. In the case of FIG. 1, the sealing member 24 is disposed doubly to improve connection reliability.

The filter devices 22 of the embodiment are disposed at positions apart (deviating) from the inlet side front face of the blower fan 20 or the inlet 16a. In the case of FIG. 1, two filter devices 22 are disposed separately not to be positioned at the front face of the blower fan 20 or the inlet 16a. Outside air (air) having passed the filter device 22 flows into the blower fan 20 or the inlet 16a through an inlet passage R defined by the partition wall 12a and the inlet side sub housing 12f. In particular, when the blower fan 20 is provided at the inlet 16a, the filter devices 22 are disposed at positions apart from the inlet side front face of the blower fan 20, as illustrated in FIG. 1, which can disperse suction force (suction air force) of the blower fan 20 relative to the filter device 22. For example, when the filter device 22 is disposed at the inlet side front face of the blower fan 20, the suction force of the blower fan 20 tends to act on a certain portion of the filter device 22, causing partial pollution due to dirt and the like mixed in outside air and the like. In this case, the functions of the filter device 22 may be deteriorated and the lifetime of the filter device 22 may be reduced. With dispersion of suction force by arrangement of the blower fan 20 and the filter devices 22 as illustrated in FIG. 1, it is possible to reduce or suppress partial pollution of the filter device 22 as described above. That is, it is possible to extend the lifetime of the filter device 22, contributing to the reduction of a maintenance frequency.

The filter device 22 only needs to remove foreign substances, such as dust and dirt, moisture, and the like so that the passage inner area A of the common cooling passage 16, the blower fan 20, and the like can maintain a given degree of cleanness, and thus a filter structure can be selected variously. For example, the filter structure may be a single-layer type or a multi-layer type. In the case of a multi-layer type, for example, an inertia filter and a fabric filter may be combined.

As described above, the outlet 16b is open in a direction different from a traveling direction of the vehicle. In the case of FIG. 1, the outlet 16b of the common cooling passage 16 is disposed at a position on an extension line (linear position) of the inlet 16a. In the case of the embodiment, considering the fluid discharge efficiency when the storage battery units are disposed adjacently, a fluid discharged from the outlet 16b is discharged downward, that is, to the back side on the paper face of FIG. 1. In the case of FIG. 1, a plurality of outlet holes 26 are formed on the side in one direction (e.g., in the direction to the back side on the paper face of FIG. 1) of an outlet side sub housing 12g connected to the housing 12 through the sealing members 24. Also in this case, the outlet holes 26 are open in a direction different from a traveling direction of the vehicle. The shape of the outlet hole 26 illustrated in FIG. 1 is an example, and the outlet hole 26 may be an angular hole and the like, or have a mesh structure in the entire formation surface or a part thereof. The outlet holes 26 may be a substantially continuous slit-shaped or a large-sized hole (long hole, long angular hole, etc.). The outlet hole 26 may be provided with a filter or an equivalent member to prevent entering of foreign substances from outside.

For example, the above-described storage battery unit 10 may be used as a power source unit for a railway vehicle. A railway vehicle may reciprocate on a route, and thus the traveling directions in a forward path and in a return path may be opposite to each other. For example, when the inlet 16a (filter device 22) is open in a traveling direction of the railway vehicle, a head wind is applied on a forward path. Thus, it is possible to take in outside air (cooling fluid) with higher efficiency than that of simply using suction force of the blower fan 20. By contrast, on a return path, outside air is taken in only by suction force of the blower fan 20. Thus, the suction performance differs between the forward path and the return path, that is, the cooling performance differs between the forward path and the return path. Similarly, when the outlet 16b (outlet hole 26) is open in a traveling direction of the railway vehicle, a flow of outside air is toward the outlet 16b side on a forward path, thus efficiently discharge air (outside air used for cooling). By contrast, on a return path, outside air flows into the passage inner area A of the common cooling passage 16 through the outlet 16b (outlet hole 26), which reduces the discharge efficiency of outside air from the passage inner area A. That is, the discharging performance differs between the forward path and the return path. As a result, also regarding the discharge of a cooling fluid, the cooling performance differs between the forward path and the return path. Then, in the storage battery unit 10 of the embodiment, both the opening direction of the inlet 16a (outside air take-in direction S of the filter device 22) and the opening direction of the outlet 16b (opening direction of the outlet hole 26) of the common cooling passage 16 are open in a different direction from a traveling direction of the railway vehicle. For example, the inlet 16a (filter device 22) is directed to the vehicle width direction (lateral sides) of the railway vehicle. In this manner, the inlet 16a (filter devices 22) is directed to a lateral side of the railway vehicle, which makes it possible to stably take in outside air regardless of a traveling direction of the railway vehicle. That is, this hardly causes a difference in outside air take-in efficiency between the forward path and the return path. Similarly, for example, the outlet 16b (outlet hole 26) is open toward the upper side of the vehicle or the lower side of the vehicle in the railway vehicle, which makes it possible to stably discharge outside air regardless of a traveling direction of the railway vehicle. That is, this hardly causes a difference in outside air discharge efficiency between the forward path and the return path. As a result, regardless of a traveling direction of the railway vehicle, the cooling efficiency in the storage battery unit 10 is made equal, achieving stable cooling of the storage battery unit 10.

The storage battery unit 10 formed in the above-described manner may be mounted on the railway vehicle as a single-layer unit supporting six battery boxes 14 as illustrated in FIG. 1 or mounted on the railway vehicle as a stacked unit in which single-layer units are stacked in a plurality of stages in the vertical direction, that is, to the back side on the paper face of FIG. 1. In the case of the stacked unit, the filter device 22 may be provided in each layer, or the filter device 22 long in a stacking direction may be disposed. Moreover, in the case of the stacked unit, the outlet hole 26 may be provided corresponding to a single layer unit in a lowest layer or an uppermost layer of the stacked unit.

As described above, the storage battery unit 10 of the embodiment is an air-cooled cooling system in which outside air as a cooling fluid is taken into the common cooling passage 16. As illustrated in FIG. 1, the air-cooled cooling structure of the embodiment is simpler and higher in robustness than the structure of a water-cooled cooling system. Thus, for example, in railway vehicles, even when vibration occurs constantly during traveling, it is possible to suppress failure of the cooling structure and the occurrence of damages due to a vibration shock.

Figure 3:
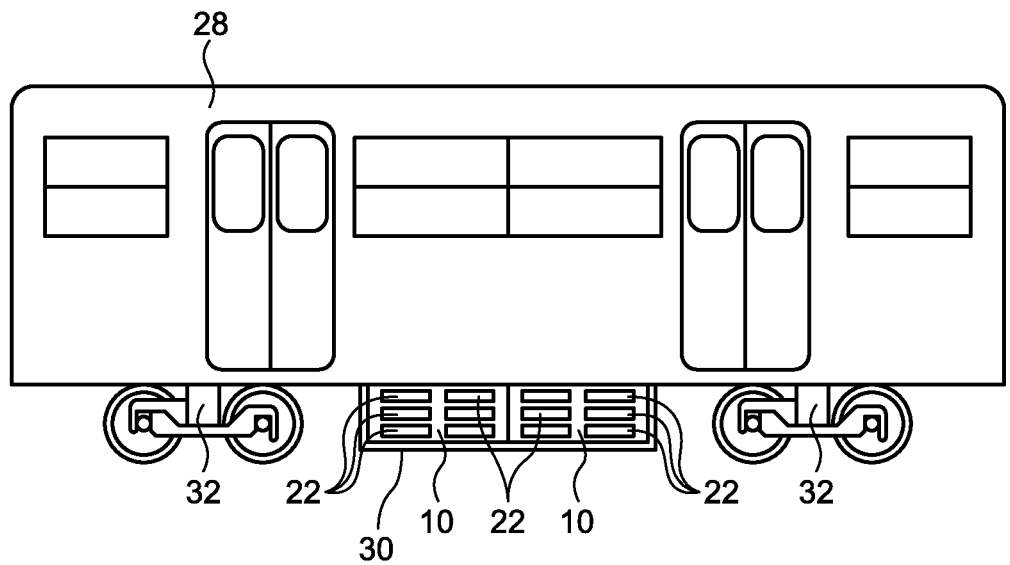
FIG. 3 is a side view explaining a state in which the vehicular storage battery device of the embodiment is disposed on an underfloor of a vehicle.
Figure 4:
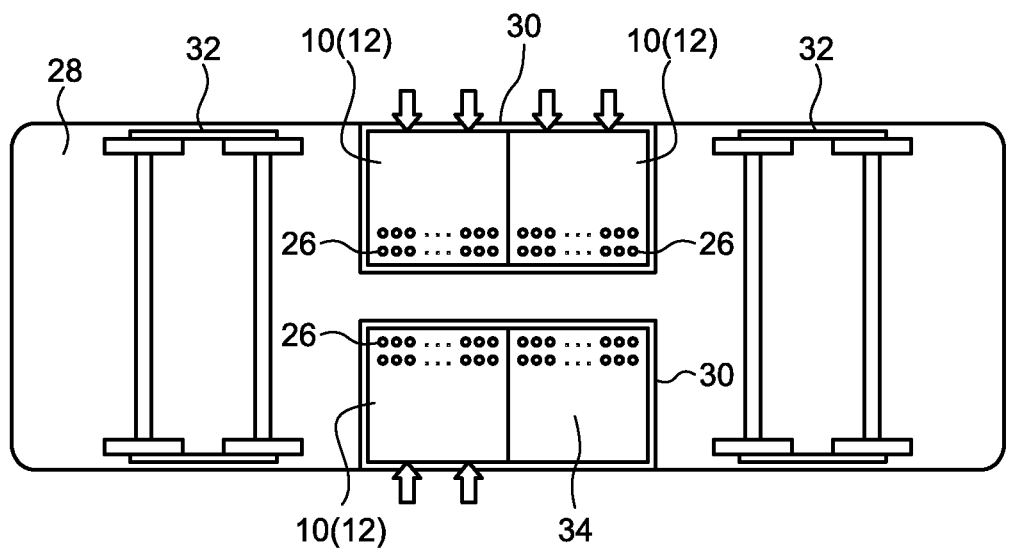
FIG. 4 is an explanatory diagram explaining a state in which the vehicular storage battery device of the embodiment is disposed separately on both sides in a vehicle width direction on the underfloor of the vehicle.
Figure 5:
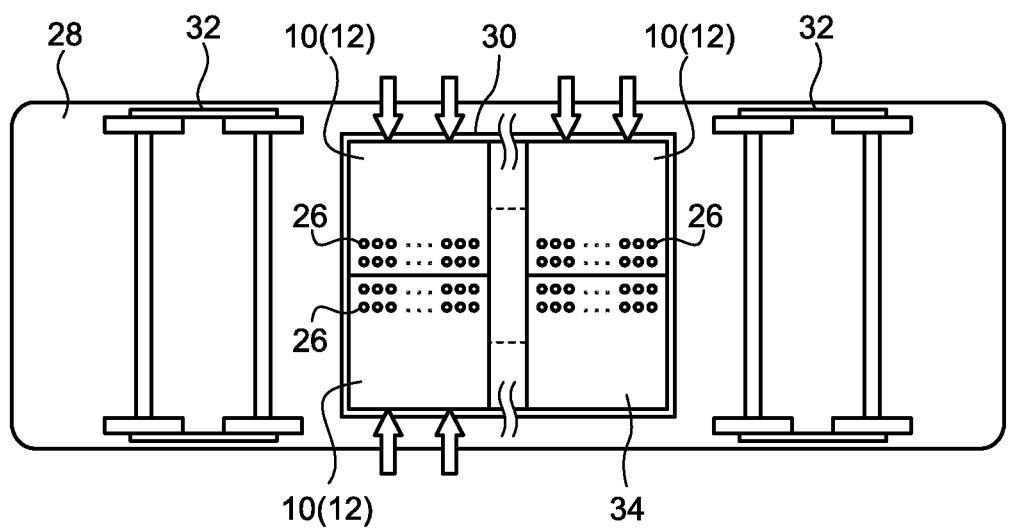
FIG. 5 is an explanatory diagram explaining another example in which the vehicular storage battery device of the embodiment is disposed on the underfloor of the vehicle.

FIG. 3, FIG. 4, and FIG. 5 are side views explaining the state in which the above-described storage battery unit 10 is disposed on an underfloor of a railway vehicle 28 that is one example of the vehicle. As described above, in the storage battery unit 10, the filter device 22 is disposed to be directed to the vehicle width direction (lateral side face) of the railway vehicle 28, which makes it possible to stably take in outside air (cooling fluid) regardless of a traveling direction of the railway vehicle 28. In the case of the embodiment, the storage battery unit 10 is supported by an exterior case 30 and fixed to the railway vehicle 28. The detail of the exterior case 30 will be described later. FIG. 3 to FIG. 5 illustrate an example in which a plurality of storage battery units 10 are arranged adjacently to one another. An assembly of the storage battery units 10 supported by the exterior case 30 can be fixed to space between front and rear carriages 32 of the railway vehicle 28. On the underfloor of the railway vehicle 28, there are disposed various devices in addition to the storage battery units 10. Therefore, depending on the arrangement of other devices, the storage battery units 10 can be supported by the separate exterior case 30 disposed in the state divided to the right and left sides in the vehicle width direction of the railway vehicle 28, as illustrated in FIG. 4. In this case, in the exterior case 30, supporting sections are provided linearly to support the battery units 10 (housing 12) along the vehicle traveling direction. The supporting section will be described later. In the case of the layout of the storage battery units 10 illustrated in FIG. 4, outside air taken in from the lateral sides of the railway vehicle 28 may be discharged from the lower side of the vehicle from the illustrated outlet holes 26. Moreover, in the case of the example of FIG. 4, a gap in the vehicle width direction exists between the exterior cases 30 disposed on the right and left sides in the vehicle width direction. Thus, the outlet holes 26 may be disposed toward the gap. In this case, the outlet holes 26 can be disposed linearly relative to the passage inner area A of the common cooling passage 16 (see FIG. 1), which can reduce discharge resistance and contribute to the improvement of cooling efficiency. In this case, it is preferable that the outlet holes 26 of the storage battery units 10 supported by the exterior cases 30 on the right and left sides in the vehicle width direction do not face each other. For example, when the outlet holes 26 of the storage battery units 10 supported by the exterior case 30 on the left side in the vehicle width direction are disposed to deviate from positions of the outlet holes 26 of the storage battery units 10 supported by the exterior case 30 on the right side in the vehicle width direction, it is possible to reduce exhaust air remaining in the gap between the exterior cases 30 arranged on the right and left sides in the vehicle width direction.

Meanwhile, in the case of the example of FIG. 5, the storage battery units 10 are collectively supported by the exterior case 30. Also in this case, in the exterior case 30, supporting sections are provided linearly to support the storage battery units 10 (housing 12) along the vehicle traveling direction. In the case of the layout of the storage battery units 10 illustrated in FIG. 5, outside air taken in from the lateral sides of the railway vehicle 28 is discharged from the lower side of the vehicle from the illustrated outlet holes 26. Also regarding the discharge of a cooling fluid, the outlet holes 26 are open in a different direction from a traveling direction of the railway vehicle 28, which makes it possible to stably discharge outside air (cooling fluid) regardless of a traveling direction of the railway vehicle 28.

The filter device 22 is one of parts requiring maintenance in the storage battery unit 10. As described above, in the embodiment, the filter devices 22 in the storage battery unit 10 are disposed on a corresponding lateral side face of the railway vehicle 28 as illustrated in FIG. 3. As illustrated in FIG. 1, the filter devices 22 are supported by the inlet side sub housing 12$f$, and thus can be attached and removed easily from the lateral side of the railway vehicle 28. Moreover, when the inlet side sub housing 12$f$ is removed, it is possible to easily access the blower fan 20 disposed on the inlet 16$a$ side of the common cooling passage 16, thus facilitating maintenance and exchange operation. Furthermore, if needed, the storage battery units 10 themselves can be easily attached and removed by access from the lateral side of the railway vehicle 28. In this manner, it is possible to easily exchange the filter devices 22 having relatively short maintenance intervals, thus enabling efficient maintenance operation of the storage battery units 10.

Each of the storage battery unit 10 requires various electronic parts to control electrical charging and discharging of housed electric cells and manage the state thereof. For example, the electronic parts include a substrate of a cell management system or a battery management system monitoring a temperature of the battery boxes 14 and an electrical charging and discharging state of the electric cells, a molded case circuit breaker (MCCB) achieving open and close operation between a main circuit and the electric cells, a service disconnector, and the like. In addition, the electronic parts include a substrate of a control circuit, a circuit power source, a safety device, various sensors such as a temperature sensor, a safety display light, a substrate of a protection circuit, an interlock mechanism, and the like. These electronic parts can be disposed in each of the storage battery units 10, or can be disposed collectively. In the embodiment, these electronic parts are housed in a sealed-type device housing 34 having substantially the same shape and size as the housing 12 of the storage battery unit 10. Then, the device housing 34 is supported in the vicinity of the storage battery unit 10 using one of supporting sections formed in the exterior case 30, as illustrated in FIG. 4 and FIG. 5. In this manner, the device housing 34 is supported by the exterior case 30 similarly to other storage battery units 10 (housings 12), which facilitates removal and attachment of the device housing 34 and enables efficient maintenance of electronic devices each having a different lifetime from the electric cells. Moreover, when the electronic parts are housed in the device housing 34, it is possible to substantially block entry of outside air and reduce the occurrence of failure of electronic parts due to mixing of dust, dirt, and moisture.

Figure 6:
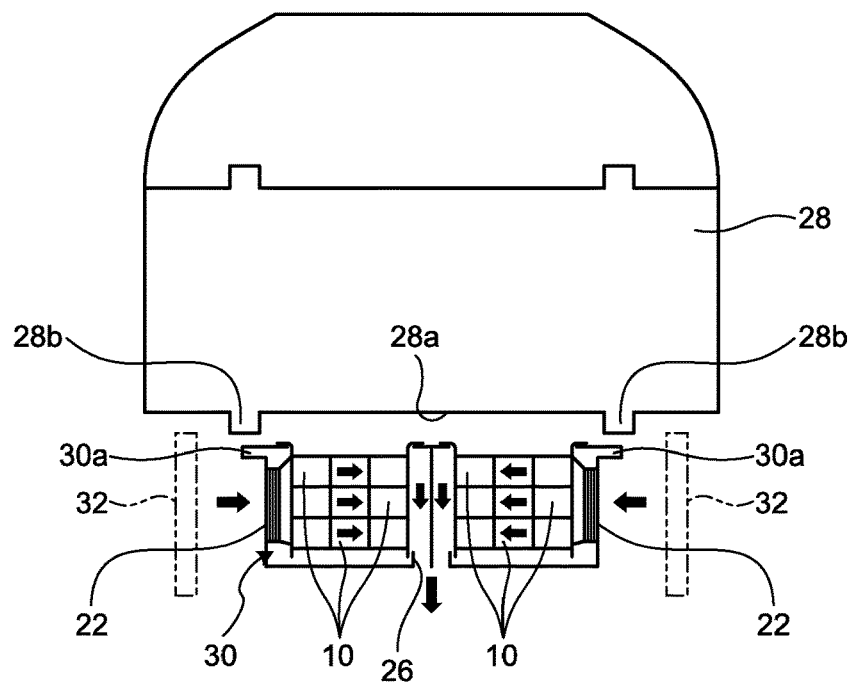
FIG. 6 is an explanatory diagram explaining a fixing structure in the case where the vehicular storage battery device of the embodiment is fixed to an underfloor part of the vehicle, and a flow of a cooling fluid.
Figure 7:
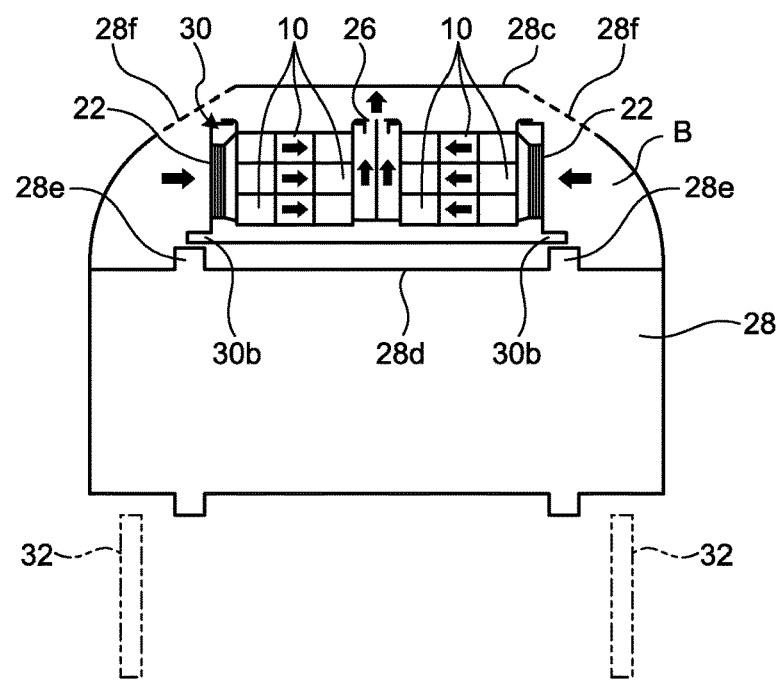
FIG. 7 is an explanatory diagram explaining a fixing structure in the case where the vehicular storage battery device of the embodiment is fixed to a roof top part of the vehicle, and a flow of a cooling fluid.

FIG. 6 and FIG. 7 are diagrams of the railway vehicle 28 when viewed from a railway direction, and are diagrams explaining concrete examples in the case where the storage battery units 10 (vehicular storage battery device) supported by the exterior case 30 are fixed to the railway vehicle 28. FIG. 6 is an explanatory diagram explaining a fixing structure in the case where the storage battery units 10 are fixed to the underfloor part of the railway vehicle 28, and a flow of a cooling fluid. FIG. 7 is an explanatory diagram explaining a fixing structure in the case where the storage battery units 10 are fixed to a roof top part of the railway vehicle 28, and a flow of a cooling fluid.

FIG. 6 illustrates a structure corresponding to FIG. 5, in which the storage battery units 10 are collectively supported by the exterior case 30. The exterior case 30 includes, on the upper face side, underfloor fixing flanges 30$a$ (under part fixing portions) to be connected and fixed to underfloor fixing bases 28$b$ formed on an underfloor 28$a$ of the railway vehicle 28. The fastening between the underfloor fixing flange 30$a$ and the underfloor fixing base 28$b$ can be performed using a bolt, a nut, and the like. When the exterior case 30 is fixed to the underfloor part of the railway vehicle 28, outside air (cooling fluid) taken in the storage battery unit 10 is performed through the filter device 22 from the lateral sides of the railway vehicle 28. In the case of FIG. 6, the storage battery units 10 are stacked in three layers, and outside air sucked from the filter devices 22 flows in each common cooling passage 16 (see FIG. 1) of the storage battery unit 10 in each layer, as illustrated by arrows in FIG. 6. Then, the outside air passes the outlet 16b to be discharged to the outside of the exterior case 30 through the outlet holes 26 open on the lower side of the vehicle. As described above, outside air is taken in from the lateral sides of the railway vehicle 28, while outside air is discharged from the lower side of the vehicle. Thus, in any of the cases of take-in and discharge, there is no influence by a traveling direction of the railway vehicle 28. Therefore, it is possible to prevent the occurrence of a difference in cooling efficiency of the storage battery unit 10 between traveling on a forward path and traveling on a return path and achieve efficient and stable cooling.

In FIG. 7, the storage battery units 10 are collectively supported by the exterior case 30, similarly to the structure of FIG. 6. The exterior case 30 includes, on the lower face side, roof top fixing flanges 30b (upper part fixing portions). The exterior case 30 is formed so that roof top fixing bases 28e formed on the upper face side of a ceiling 28d and the roof top fixing flanges 30b are fastened to each other in a roof top part B formed between a roof 28c for avoiding rain, snow, and the like and the ceiling 28d that is a partition wall to the cabinet side. The roof top fixing flange 30b and the roof top fixing base 28e can be fastened using a bolt, a nut, and the like. When the exterior case 30 is fixed to the roof top part B of the railway vehicle 28, outside air (cooling fluid) is taken in the storage battery unit 10 through the filter devices 22 from the lateral sides of the railway vehicle 28. The roof top part B is covered by the roof 28c, and thus vent holes 28f are formed on the roof 28c in the vicinity of the filter device 22 so that outside air can enter and exit easily. In the case of FIG. 7, the storage battery units 10 are stacked in three layers, and outside air sucked from the filter devices 22 flows in the common cooling passage 16 (see FIG. 1) of the storage battery unit 10 in each layer, as illustrated by arrows in FIG. 7. Then, the outside air passes the outlet 16b to be discharged to the outside of the exterior case 30 through the outlet holes 26 open on the upper side of the vehicle. As described above, outside air is taken in from the lateral sides of the railway vehicle 28, while outside air is discharged from the lower side of the vehicle. Thus, in any of the cases of take-in and discharge, there is no influence by a traveling direction of the railway vehicle 28. Therefore, it is possible to prevent the occurrence of a difference in cooling efficiency of the storage battery unit 10 between traveling on a forward path and traveling on a return path and achieve efficient and stable cooling. The cooling fluid (air) discharged from the outlet holes 26 can be discharged through the vent holes 28f, and with the vent holes corresponding to the opening positions of the outlet holes 26, it is possible to prevent the filter device 22 from sucking the used cooling fluid (heated air) again and contribute to the improvement of cooling efficiency.

Figure 8:
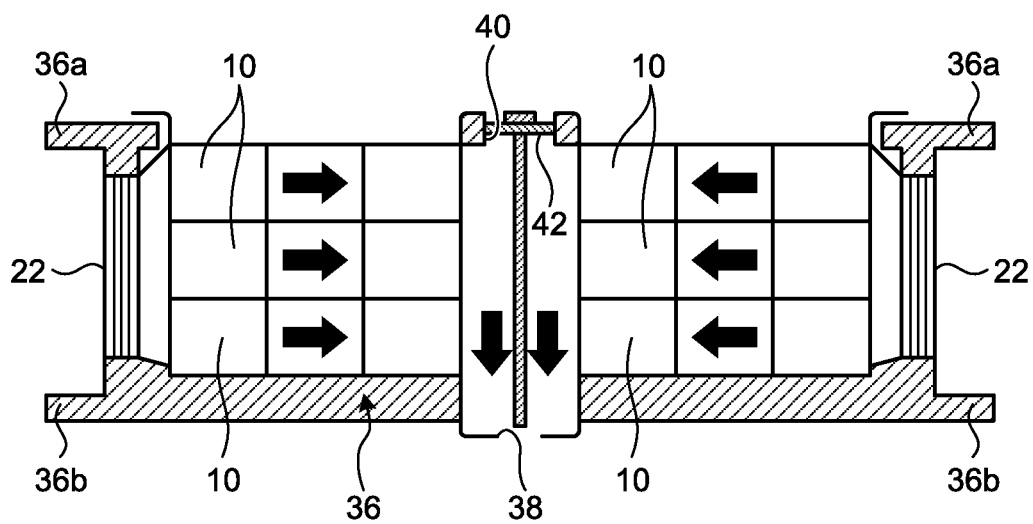
FIG. 8 is a diagram illustrating a structure of an exterior case allowing selection between fixing to a roof top part and fixing to the underfloor part in the vehicular storage battery device of the embodiment, and is a diagram illustrating the form of fixing to the underfloor part.
Figure 9:
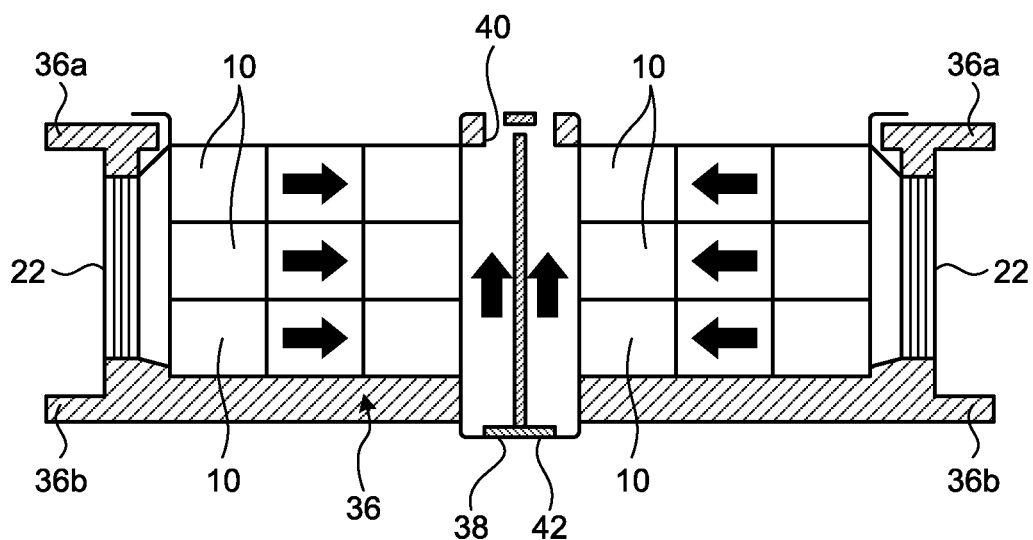
FIG. 9 is a diagram illustrating a structure of an exterior case allowing selection between fixing to a roof top part and fixing to the underfloor part in the vehicular storage battery device of the embodiment, and is a diagram illustrating the form of fixing to the roof top part.

FIG. 8 and FIG. 9 are diagrams explaining a modification of the above-described exterior case 30. An exterior case 36 illustrated in FIG. 8 and FIG. 9 is a common exterior case applicable to both underfloor fixing illustrated in FIG. 6 and roof top fixing illustrated in FIG. 7. Although the basic structure of the exterior case 36 is same as the exterior case 30 illustrated in FIG. 6 and FIG. 7, the exterior case 36 includes both underfloor fixing flanges 36a (under part fixing portions) and roof top fixing flanges 36b (upper part fixing portions). Moreover, the exterior case 36 includes a planned lower-side opening portion 38 for discharging a cooling fluid from the lower side of the vehicle when the exterior case 36 is fixed by the underfloor fixing flanges 36a, and a planned upper-side opening portion 40 for discharging a cooling fluid from the upper side of the vehicle when the exterior case 36 is fixed by the roof top fixing flanges 36b. Then, one of the planned upper-side opening portion 40 and the planned lower-side opening portion 38 is closed by a blocking member 42 when it is not used.

FIG. 8 is an application example of the blocking member 42 in the case where the exterior case 36 is fixed to the underfloor of the railway vehicle 28. In this case, the planned upper-side opening portion 40 is blocked by the blocking member 42, and the planned lower-side opening portion 38 is open. That is, cooling outside air sucked from the filter devices 22 passes the common cooling passages 16 (see FIG. 1) of the storage battery units 10 to be discharged from the lower side of the vehicle through the unblocked planned lower-side opening portion 38. That is, when the exterior case 36 is fixed to the underfloor of the exterior case 36, a used cooking fluid is prevented from flowing to the floor face side where discharge efficiency is deteriorated due to the underfloor 28a.

FIG. 9 is an application example of the blocking member 42 in the case where the exterior case 36 is fixed to the roof top part B of the railway vehicle 28. In this case, the planned lower-side opening portion 38 is blocked by the blocking member 42, and the planned upper-side opening portion 40 is open. That is, cooling outside air sucked from the filter devices 22 passes the common cooling passages 16 (see FIG. 1) of the storage battery units 10 to be discharged from the upper side of the vehicle through the unblocked planned upper-side opening portion 40. That is, when the exterior case 36 is fixed to the roof top, a used cooling fluid is prevented from flowing to the ceiling face side because the ceiling 28d deteriorates discharge efficiency.

The blocking member 42 only needs to prevent a flow of a cooling fluid, and for example, may be formed of a metal plate or a resin plate. Moreover, on the unblocked side, that is, on the planned lower-side opening portion 38 or the planned upper-side opening portion 40 where the blocking member 42 is not attached, a mesh plate or the like may be attached to prevent entry of foreign substances or the like on the outlet side. Moreover, a mesh plate may be attached on the planned lower-side opening portion 38 and the planned upper-side opening portion 40, and the side requiring blocking may be blocked by the blocking member 42. Furthermore, the planned lower-side opening portion 38 and the planned upper-side opening portion 40 may be blocked in the initial state by parts integrated with the exterior case 36, and the parts blocking the planned lower-side opening portion 38 or the planned upper-side opening portion 40 on the side to be unblocked may be removed (detached, fractured).

In this manner, with the use of the exterior case 36 applicable to both underfloor fixing and roof top fixing, the parts can be used in common, which contributes to the reduction of manufacturing costs, the simplification of assembling operation, and the like.

Figure 10:
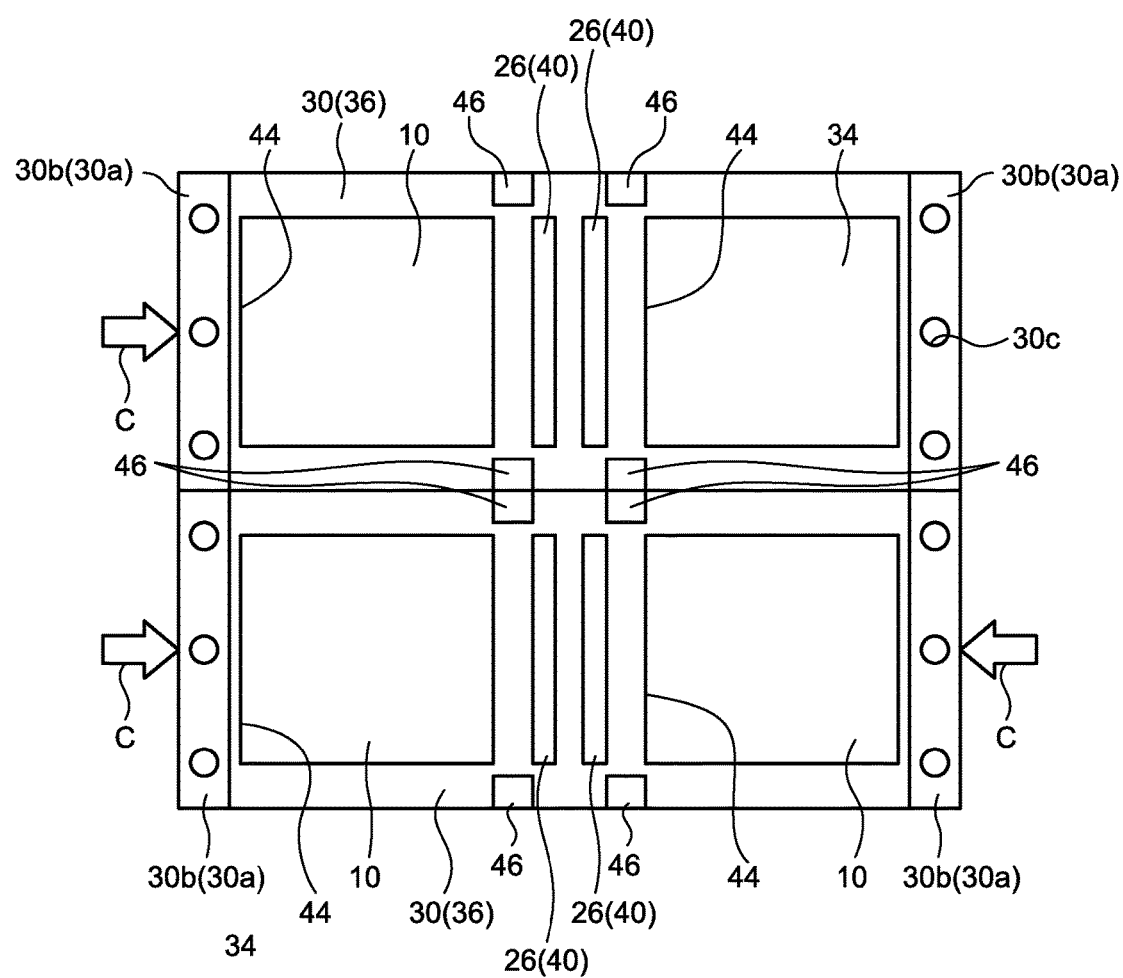
FIG. 10 is a topside view of the exterior case of the vehicular storage battery device according to the embodiment.

FIG. 10 is a topside view of the exterior case 30 (exterior case 36) for roof top fixing. For example, the exterior case 30 (exterior case 36) is a box-shaped frame formed of metal, and includes a plurality of supporting sections 44 supporting a plurality of arranged housings 12 (storage battery unit 10). For example, the storage battery unit 10 is inserted so as to be dropped from the upper side of the supporting section, and thus supported by the exterior case 30 (exterior case 36).

Moreover, the storage battery unit 10 may be fixed to the exterior case 30 (exterior case 36) using a fixing member such as a bolt. FIG. 10 illustrates the case in which two exterior cases 30 having two supporting sections 44 are connected. However, the number of supporting sections 44 formed is not limited thereto, and may be one or three or more. As illustrated in FIG. 5, the device housing 34 housing electronic parts different from the electric cell is disposed in at least one of the supporting sections 44. Therefore, in FIG. 10, outside air is sucked to the storage battery units 10 supported in three supporting sections 44 as illustrated by arrows C, and outside air is blocked for the remaining one supporting section 44 because of the existence of the device housing 34. The roof top fixing flanges 30b are formed on the lower both ends of the exterior case 30. Using bolt holes 30c formed on the roof top fixing flanges 30b, the exterior case 30 is fastened to the roof top fixing bases 28e. In the case of the exterior case 36, the underfloor fixing flanges 30a can be viewed in the topside view. Moreover, between the supporting section 44 and the supporting section 44 in the exterior case 30, there are formed the outlet holes 26 (planned upper-side opening portion 40 in the case of the exterior case 36) for discharging a cooling fluid from the roof top side. In the case of FIG. 10, the outlet holes 26 (planned upper-side opening portion 40) have a long-hole shape in two lines. A mesh plate may be provided on the outlet hole 26 (planned upper-side opening portion 40). When the exterior case 36 is used for underfloor fixing, the planned upper-side opening portion 40 is blocked by the blocking member 42, as illustrated in FIG. 8. In the exterior case 30 (exterior case 36) illustrated in FIG. 10, there are arranged a plurality of reinforcing members 46 extending in, for example, a paper face vertical direction to secure frame rigidity.

The exterior case 30 (exterior case 36) illustrated in FIG. 10 illustrates the example in which the supporting sections 44 are arranged in the vehicle width direction. Meanwhile, in the case where the exterior case 30 (exterior case 36) is arranged to be divided to both sides in the vehicle width direction of the railway vehicle 28, as illustrated in FIG. 4, a plurality of supporting sections 44 may be arranged linearly along a traveling direction of the railway vehicle 28. In such a case, when a plurality of exterior cases 30 are connected, they are connected along the traveling direction of the railway vehicle 28. In this manner, with the use of the exterior case 30 (exterior case 36) including the supporting sections 44, it is possible to securely support the storage battery unit 10 and the device housing 34. Moreover, when the exterior case 30 (exterior case 36) supports the storage battery unit 10 and the device housing 34, for example, a vibration-proof member or the like is interposed at the contact portion between the exterior case 30 and the storage battery unit 10 or the device housing 34, thus easily improving vibration resistance.

As described above, the vehicular storage battery device of the embodiment includes the housing 12, the battery boxes 14, and the common cooling passage 16. The battery box 14 is disposed in the housing 12, and houses the electric cell that is a vehicle power source and includes the heat transporting part 18 transporting heat generated in the battery box 14 to the outside of the battery box 14. The common cooling passage 16 is disposed in the housing 12, and the inlet 16a for taking in a fluid and the outlet 16b for discharging a fluid having passed through the passage are open in a direction different from a traveling direction of the vehicle. In addition, each of the heat transporting parts 18 of the battery boxes 14 is exposed to the inside of the passage.

In this structure, for example, it is possible to efficiently radiate heat generated by repeated electrical charging and discharging and cool the batteries effectively. Moreover, outside air as a cooling medium flows in the common cooling passage 16 and comes into contact only with a part of the heat transporting part 18. That is, outside air as a cooling medium is not contact with the electric cell in the battery box 14. As a result, the electronic parts including the batteries can avoid contact with dust, moisture, and the like as much as possible, thus suppressing contamination of batteries. Moreover, a plurality of heat radiation parts 18b are gathered on the common cooling passage 16, which achieves a simple cooling structure and improves robustness of the cooling structure. Furthermore, the inlet 16a and the outlet 16b of a cooling fluid are open in a different direction from a traveling direction of the railway vehicle 28, which makes it possible to stably suck and discharge outside air (cooling fluid) regardless of the traveling direction of the railway vehicle 28. As a result, it is possible to achieve efficient cooling in the same level between traveling on a forward path and traveling on a return path of the railway vehicle 28.

Moreover, for example, the outlet 16b of the vehicular storage battery device of the embodiment may allow discharge of a fluid from one of the upper side of the vehicle and the lower side of the vehicle. In this structure, it is possible to stably discharge a fluid regardless of a traveling direction of the vehicle, which suppresses variation of cooling efficiency depending on a traveling direction.

The vehicular storage battery device of the embodiment may include the exterior cases 30, 36 with the supporting sections 44 supporting the arranged housings 12. In this structure, it is possible to stably support the storage battery units 10. In addition, the supporting form is common, which facilitates attachment and removal of the storage battery unit 10 and contributes to the improvement of maintainability.

In the vehicular storage battery device of the embodiment, for example, there may be disposed the device housing 34 housing electronic parts different from electric cells in at least one of the supporting sections 44 of the exterior cases 30, 36. In this structure, the electric parts driving or maintaining each storage battery unit 10 can be housed separately and divided from the cooling structure of the storage battery unit 10. Thus, it is possible to protect the electric parts from dirt, dust, moisture, and the like that can be mixed in a cooling fluid.

Moreover, the exterior case 36 of the vehicular storage battery device of the embodiment may include the roof top fixing flanges 36b (upper part fixing portions) for fixing to the roof top part of the vehicle, the underfloor fixing flanges 36a (lower part fixing portions) for fixing to the underfloor part of the vehicle, the planned upper-side opening portion 40 for discharging a fluid from the vehicle upper side when the exterior case 36 is fixed by the roof top fixing flanges 36b, and the planned lower-side opening portion 38 for discharging a fluid from the vehicle lower side when the exterior case 36 is fixed by the underfloor fixing flanges 36a. In this structure, for example, regardless of the case where the vehicular storage battery device is disposed on the roof top or on the underfloor of the vehicle, the same exterior case 36 can be used. As a result, the parts can be shared, which contributes to the reduction of manufacturing costs and the simplification of assembling operation.

Moreover, for example, the blocking member 42 may prevent discharge of a fluid at one of the planned upper-side opening portion 40 and the planned lower-side opening portion 38 of the vehicular storage battery device of the embodiment. In this structure, for example, regardless of the case where the vehicular storage battery device is disposed on the roof top or on the underfloor of the vehicle, the blocking member 42 can change a form to be applicable. As a result, it is possible to contribute to the simplification of assembling operation and the reduction of manufacturing costs using common parts.

Moreover, in the vehicular storage battery device of the embodiment, the exterior cases 30, 36 may include the supporting sections 44 provided linearly to support a plurality of housings 12 along a traveling direction of the vehicle. In this structure, for example, it is possible to make an access direction to the housing 12 and the device housing 34 supported by the exterior cases 30, 36 a certain direction. As a result, the maintainability of the storage battery unit 10 and electric parts is improved, which facilitates the maintenance.

Moreover, the heat transporting part 18 of the vehicular storage battery device of the embodiment may include the heat pipe 18*a* thermally connected to a wall face of the battery box 14 and the heat radiation part 18*b* thermally connected to one end of the heat pipe 18*a* and exposed in the common cooling passage 16. In this structure, it is possible to efficiently transport heat generated in the battery box 14 to the inside of the common cooling passage 16, which contributes to the improvement of cooling efficiency.

Moreover, the vehicular storage battery device of the embodiment may further include the filter device 22 disposed at a position deviating from the sucking side front face of the inlet 16*a*, and the inlet passage R connecting the filter device 22 and the inlet 16*a*. In this structure, for example, it is possible to disperse suction force of the inlet 16*a* relative to the filter device 22. As a result, it is possible to suppress the occurrence of partial contamination due to dust, dirt, and the like that can be mixed in a fluid because of the suction force acting on a specific part of the filter device 22, which suppresses the deterioration of functions of the filter device 22 and the reduction of the lifetime of the filter device 22.

The embodiment and the modification of the invention have been exemplified above. The above-described embodiment and modification are only one examples, and do not intend to limit the scope of the invention. The embodiment and modification described herein may be implemented in a variety of other forms, and various omissions, substitutions, combinations, and changes may be made without departing from the spirit of the invention. Such embodiments and the modification fall within the scope and spirit of the invention and fall within the invention in claims and the equivalents thereof. In addition, the structures of the embodiment and modification may be substituted partially for implementation.

The invention claimed is:

1. A vehicular storage battery device configured to be mounted on a vehicle, the vehicular storage battery device comprising:
    a plurality of housings;
    battery boxes disposed in each of the housings, each of the battery boxes housing an electric cell as a vehicle power source and including a heat transporting part to transport heat generated in the battery box to outside of the battery box;
    a common cooling passage disposed in each of the housings, wherein in each of the housings (i) the common cooling passage is provided with an inlet for taking in a fluid and an outlet for discharging the fluid having passed through the passage, (ii) each of the inlet and the outlet are configured to be open in a direction different from a traveling direction of the vehicle, and (iii) the heat transporting part of each of the battery boxes is exposed to inside of the passage; and
    an exterior case that includes supporting sections that support the housings;
    wherein the exterior case includes:
        an upper part fixing portion for fixing the exterior case to a rooftop part of the vehicle;
        a lower part fixing portion for fixing the exterior case to an underfloor part of the vehicle;
        a planned upper-side opening portion to discharge the fluid toward above the vehicle when the exterior case is fixed the vehicle by the upper part fixing portion; and
        a planned lower-side opening portion to discharge the fluid toward below the vehicle when the exterior case is fixed to the vehicle by the lower part fixing portion.

2. The vehicular storage battery device according to claim 1, wherein the outlet discharges the fluid from one of a vehicle upper side and a vehicle lower side.

3. The vehicular storage battery device according to claim 1, wherein a device housing that houses an electronic part different from the electric cell is supported by one of the supporting sections of the exterior case.

4. The vehicular storage battery device according to claim 1, wherein at one of the planned upper-side opening portion and the planned lower-side opening portion, a blocking member prevents discharge of the fluid.

5. The vehicular storage battery device according to claim 1, wherein the exterior case includes supporting sections provided linearly to support the housings along a traveling direction of the vehicle.

6. The vehicular storage battery device according to claim 1, wherein the heat transporting part of each battery box includes a heat pipe thermally connected to a wall face of the battery box, and a heat radiation part thermally connected to one end of the heat pipe and exposed in the common cooling passage of the housing in which the battery box is disposed.

7. The vehicular storage battery claim 1, wherein each of the housings comprises:
    a filter device disposed at a position deviating from a sucking side front face of the inlet of the common cooling passage in the housing; and
    an inlet passage connecting the filter device and the inlet.

* * * * *